United States Patent
Otaka

(10) Patent No.: US 8,564,817 B2
(45) Date of Patent: Oct. 22, 2013

(54) PRINTING SYSTEM AND CONTROL METHOD FOR PRINTING SYSTEM

(75) Inventor: Satoshi Otaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 341 days.

(21) Appl. No.: 12/955,715

(22) Filed: Nov. 29, 2010

(65) Prior Publication Data

US 2011/0157630 A1 Jun. 30, 2011

(30) Foreign Application Priority Data

Dec. 24, 2009 (JP) ................................ 2009-293206

(51) Int. Cl.
- *G06F 3/12* (2006.01)
- *H04N 1/40* (2006.01)
- *H04N 1/00* (2006.01)
- *G03G 15/00* (2006.01)

(52) U.S. Cl.
USPC ........... 358/1.15; 358/3.23; 358/401; 399/16; 399/389; 399/391

(58) Field of Classification Search
None
See application file for complete search history.

(56) References Cited

U.S. PATENT DOCUMENTS

2007/0230972 A1* 10/2007 Akashi ............................ 399/16

FOREIGN PATENT DOCUMENTS

| JP | 11-349150 A | 12/1999 |
| JP | 2003-300362 A | 10/2003 |

* cited by examiner

*Primary Examiner* — Thomas Lett
(74) *Attorney, Agent, or Firm* — Fitzpatrick, Cella, Harper & Scinto

(57) ABSTRACT

In a case where a first identifier that is communicated between the printing apparatus and the information processing apparatus in order to specify a type of a printing medium that is used in the printing apparatus, and a second identifier unique to each of a plurality of types of printing media are set in both the printing apparatus and the information processing apparatus, the second identifier set in each of the information processing apparatus and the printing apparatus is obtained. Based on the second identifier set in each of the information processing apparatus and the printing apparatus, the first identifier set in each of the information processing apparatus and the printing apparatus is determined, such that the types of printing medium corresponding to the first identifier set in the information processing apparatus and the printing apparatus match, and a different first identifier is set regarding a printing medium of a different type.

19 Claims, 8 Drawing Sheets

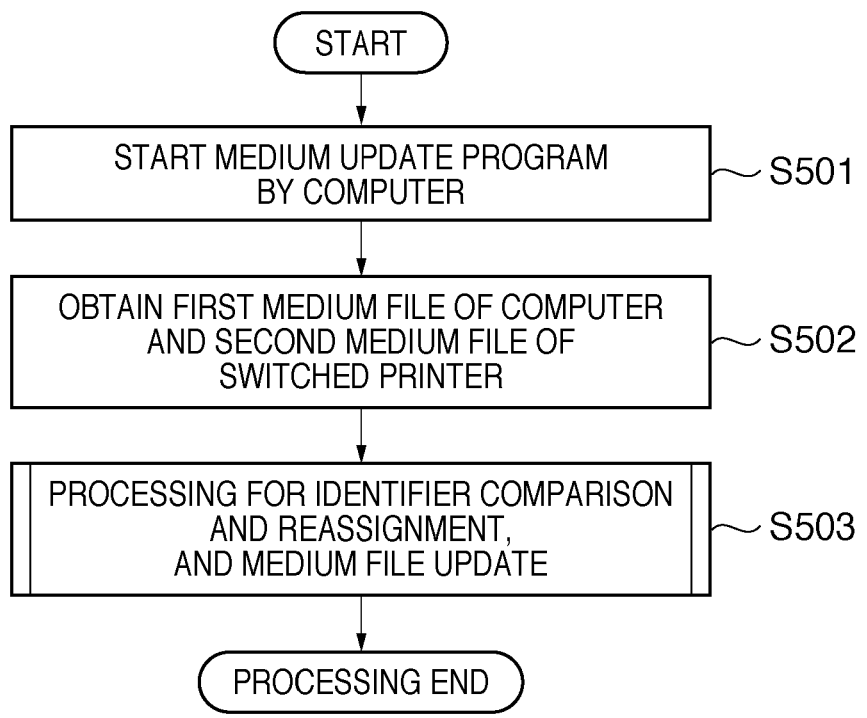

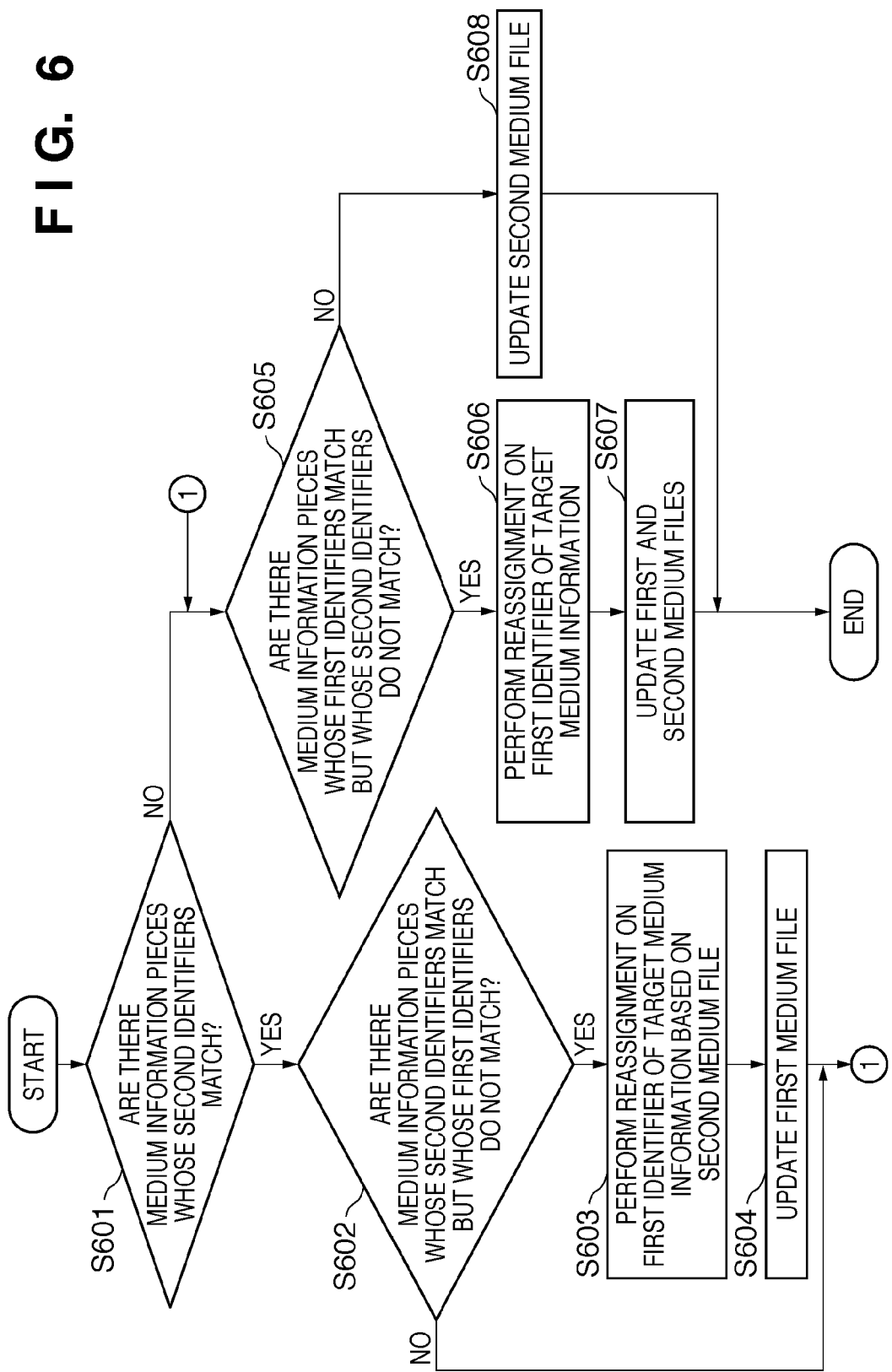

PRINTING SYSTEM AND CONTROL METHOD FOR PRINTING SYSTEM

BACKGROUND OF THE INVENTION

1. Field of the Invention

The present invention relates to a printing system including a printing apparatus that performs printing in accordance with a printing instruction from an information processing apparatus, and a control method for the printing system.

2. Description of the Related Art

There are cases where a printing apparatus supports many types of media (recording media) such as glossy paper and plain paper. In such cases, an image processing table that is required for image processing and control information for the printing apparatus may differ for each medium.

In view of this, print processing onto a medium that is desired by a user can be appropriately performed by setting an identifier according to each type of medium and identifying the type of medium to be used for printing. As a method for assigning an identifier to each medium type, Japanese Patent Laid-Open No. 2003-300362 discloses that a paper identification number is assigned to paper set in a printer. Further, Japanese Patent Laid-Open No. 11-349150 discloses that an identifier is assigned to a paper cassette.

If identifiers are set according to types of media as with the technology disclosed in the above documents, identifiers are set by firmware in the printing apparatus, and identifiers are set by a printer driver in the information processing apparatus, thereby enabling management of the types of media in each of the apparatuses.

However, in the case of a printing system where an information processing apparatus and a printing apparatus are connected, it is necessary to commonly manage medium types in the information processing apparatus and the printing apparatus. For example, an identifier "1" is assigned to a certain medium type, and an identifier "2" is assigned to another medium type in the information processing apparatus and the printing apparatus. Accordingly, in the information processing apparatus and the printing apparatus, these medium types can be distinguished by achieving consistency of the medium types corresponding to the identifiers. Consequently, printing can be performed in the state where the medium type to which image processing executed in the information processing apparatus corresponds has consistency with the medium type to which print control executed in the printing apparatus corresponds, for example.

Here, consider a printing system including a plurality of information processing apparatuses and a plurality of printing apparatuses. In such a case, information for specifying medium types is held in both an information processing apparatus A and a printing apparatus A, for example. Further, similarly, information for specifying medium types is held in both an information processing apparatus B and a printing apparatus B.

However, in the case where the printing apparatus connected to the information processing apparatus is changed, such as the case where the printing apparatus B is connected to the information processing apparatus A, information indicating medium types managed with different methods is held in the apparatuses. If print processing is performed in such a case, the medium type to which image processing performed in the information processing apparatus corresponds and the medium type to which control by the printing apparatus corresponds may differ from each other, due to the medium types in the information processing apparatus and the printing apparatus lacking consistency. In this case, processing for different types of recording media will be performed in the image processing apparatus and the printing apparatus, and thus problems may arise with the printing results, such as differences in shade and blurring, for example.

SUMMARY OF THE INVENTION

An aspect of the present invention is to eliminate the above-mentioned problems with the conventional technology. The present invention provides a printing system that enables printing to be appropriately performed according to the type of printing medium in a system including an information processing apparatus and a printing apparatus, a control method for the printing system, and a storage medium.

The present invention in its first aspect provides a printing system including an information processing apparatus and a printing apparatus, the system comprising, an obtaining unit configured to, in a case where a first identifier that is communicated between the printing apparatus and the information processing apparatus in order to specify a type of a printing medium that is used in the printing apparatus, and a second identifier unique to each of a plurality of types of printing media are set in both the printing apparatus and the information processing apparatus, obtain the second identifier set in each of the information processing apparatus and the printing apparatus; and a determination unit configured to, based on the second identifier set in the information processing apparatus and the second identifier set in the printing apparatus obtained by the obtaining unit, determine the first identifier set in each of the information processing apparatus and the printing apparatus, such that the types of printing medium corresponding to the first identifier set in the information processing apparatus and the printing apparatus match, and a different first identifier is set with respect to a printing medium of a different type.

The present invention in its second aspect provides a control method for a printing system including an information processing apparatus and a printing apparatus, the method comprising: in a case where a first identifier that is communicated between the printing apparatus and the information processing apparatus in order to specify a type of a printing medium that is used in the printing apparatus, and a second identifier unique to each of a plurality of types of printing media are set in both the printing apparatus and the information processing apparatus, obtaining the second identifier set in each of the information processing apparatus and the printing apparatus; and based on the second identifier set in the information processing apparatus and the obtained second identifier set in the printing apparatus, determining the first identifier set in each of the information processing apparatus and the printing apparatus, such that the types of printing medium corresponding to the first identifier set in the information processing apparatus and the printing apparatus match, and a different first identifier is set with respect to a printing medium of a different type.

According to the present invention, printing can be performed on an appropriate printing medium in a system including a plurality of information processing apparatuses and a plurality of printing apparatuses, even in the case where a printing apparatus to which an information processing apparatus gives a print instruction is changed.

Further features of the present invention will become apparent from the following description of exemplary embodiments with reference to the attached drawings.

BRIEF DESCRIPTION OF THE DRAWINGS

FIG. 5 is a flowchart showing an overview of a processing procedure for updating medium information.

FIG. 6 is a flowchart showing details of processing in S503 shown in FIG. 5.

DESCRIPTION OF THE EMBODIMENTS

Figure 1:
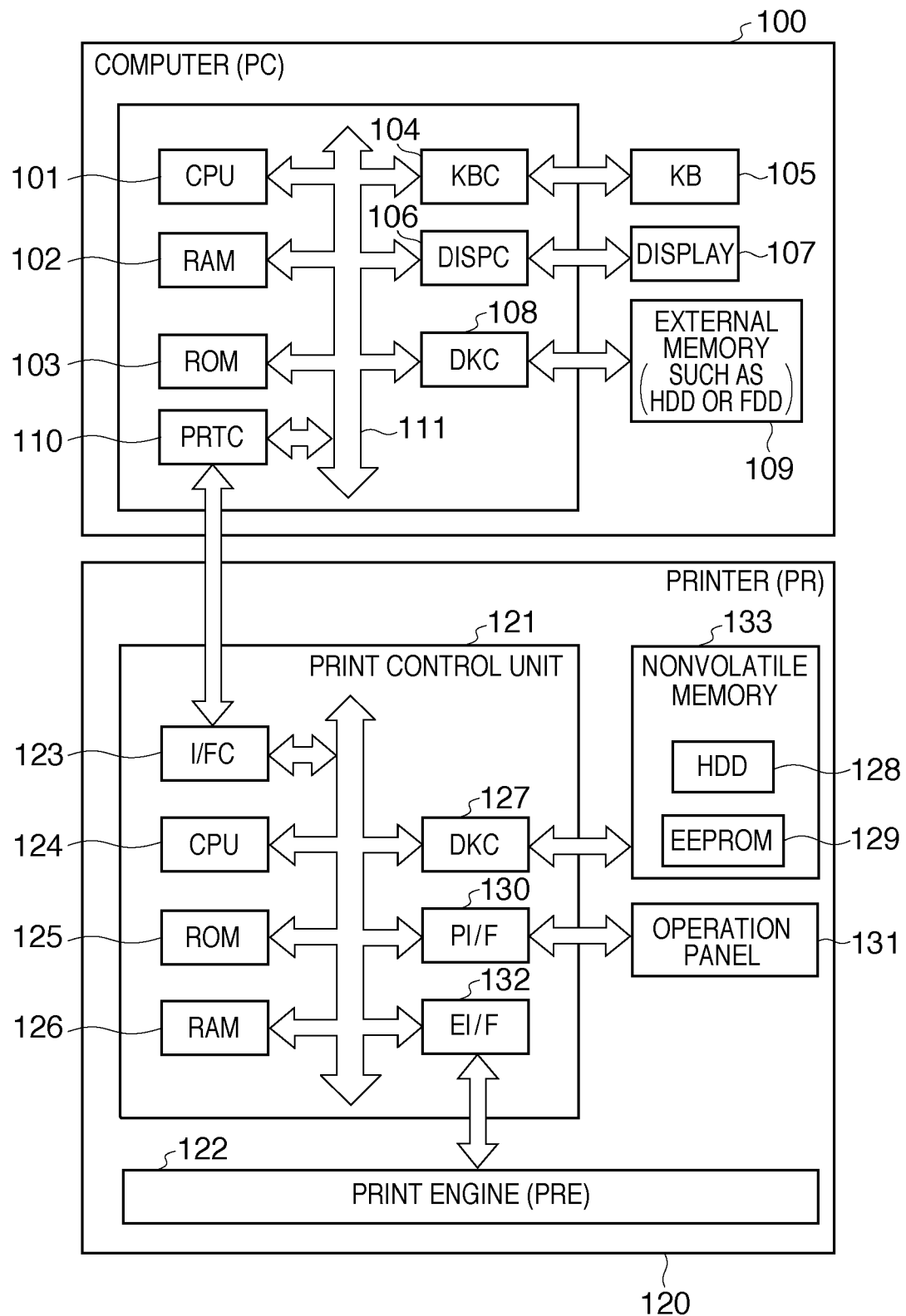
FIG. 1 is a diagram showing the configuration of a printing system according to an embodiment of the present invention.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. It should be noted that the same reference numerals are given to the same constituent elements, and a description thereof is omitted.

FIG. 1 is a diagram showing the configuration of a printing system according to an embodiment of the present invention. Although it is assumed that this system includes a plurality of computers (information processing apparatuses) that give print instructions and a plurality of printers (printing apparatuses), FIG. 1 shows a single computer and a single printer to simplify the description. A printer 120 is connected to a computer 100 such as a PC as shown in FIG. 1. The computer 100 includes a CPU 101, a keyboard 105, a keyboard controller (KBC) 104, a display 107, and a display controller (DISPC) 106. Furthermore, the computer 100 includes a RAM 102, a ROM 103, an external memory 109, a disk controller (DKC) 108, and a printer controller (PRTC) 110 as shown in FIG. 1. The CPU 101 performs overall control of the units connected to a system bus 111, and executes various programs. The keyboard controller 104 controls input via the keyboard 105, a pointing device (not shown, and the like. The display controller 106 controls display on the display 107. The RAM 102 functions as a main memory and as a work area for the CPU 101. The ROM 103 stores an operating system, a program executed in the present embodiment, a boot program, various applications, a user file, a printer driver, and the like. The disk controller 108 controls access to the external memory 109 such as a hard disk or a floppy disk (registered trademark). The printer controller 110 is connected to the printer 120 via a network, and controls processing for communication of data and commands with the printer 120.

The printer 120 includes a print engine 122, a print control unit 121, a nonvolatile memory 133, and an operation panel 131, and is connected to the computer 100 via the network. The nonvolatile memory 133 includes a hard disk (HDD) 128 and an EEPROM 129. The print control unit 121 includes a CPU 124, a ROM 125, a RAM 126, an interface controller (I/FC) 123, a disk controller (DKC) 127, a panel interface (PI/F) 130, and an engine interface (EI/F) 132. The CPU 124 executes various programs. The ROM 125 stores a program and various data. For example, the program is for receiving data and commands from the computer 100, and realizing optimal printing by controlling the print engine 122. The RAM 126 temporarily stores various data and various programs. The interface controller 123 is connected to the computer 100 via the network, and controls processing for communication of data and commands with the computer 100. The hard disk 128 stores a large amount of data such as print data from the computer 100 and information with regard to the print data. The EEPROM 129 stores information particular to the printer used when printing is performed, and the like. The disk controller 127 controls access to the nonvolatile memory 133. The panel interface 130 controls display on the operation panel 131 and input from a user. The engine interface 132 controls the print engine 122 that realizes optimal printing by directly controlling hardware. The print engine 122 performs optimal printing by directly controlling hardware. In the present embodiment, for example, an ink jet print engine or an electrophotographic print engine is used as the print engine 122.

Figure 2:
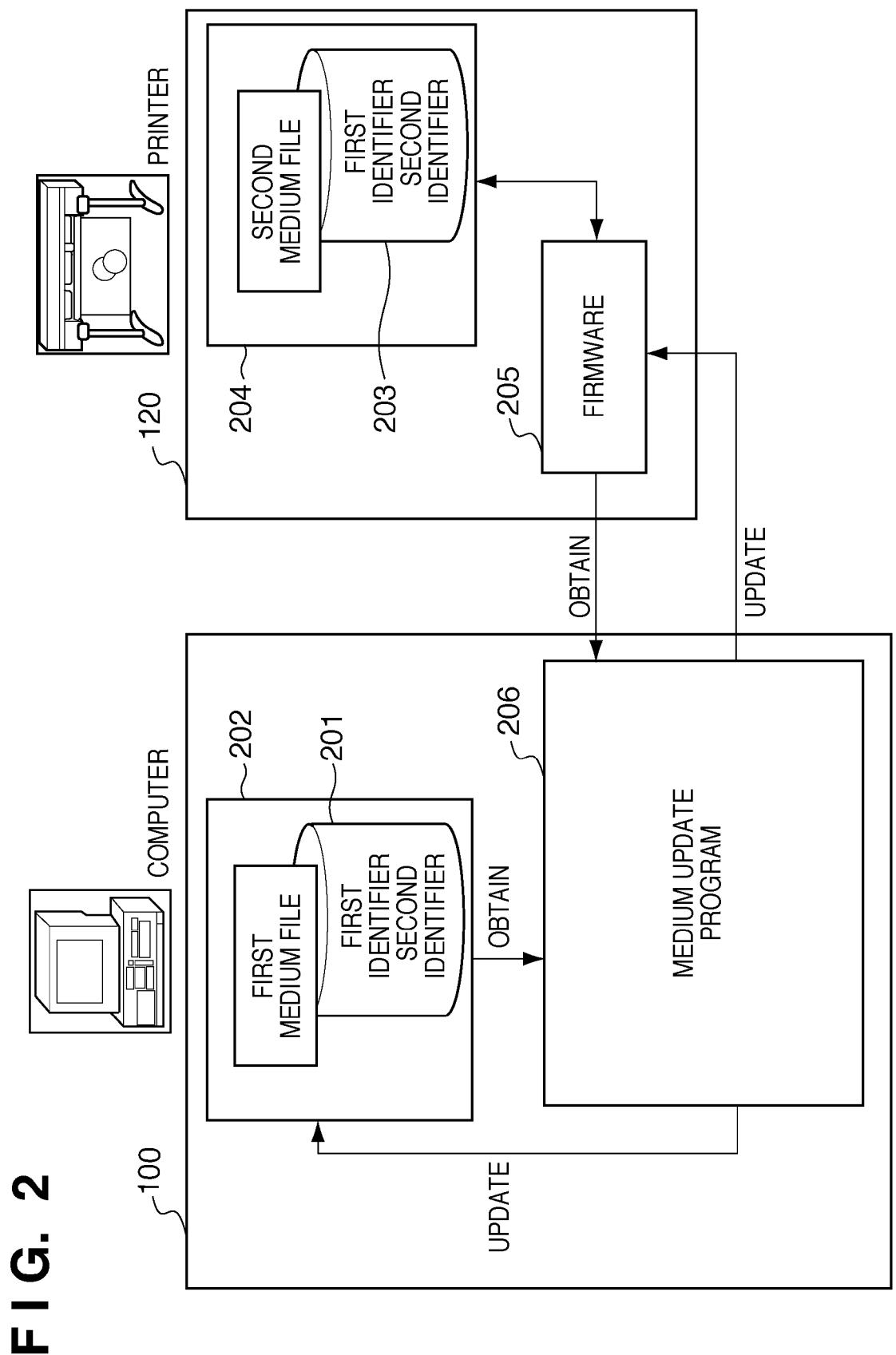
FIG. 2 is a diagram showing the implementation state of software necessary for medium information update processing.

FIG. 2 is a diagram illustrating the implementation state of software necessary for medium information update processing executed in the present embodiment. The computer 100 stores a first medium file 201 for specifying a print medium on which printing is performed in the printer 120 in a first medium file storage region 202. Note that the first medium file storage region 202 is set in a nonvolatile memory such as the ROM 103. Further, the first medium file 201 can include a plurality of medium information pieces (printing medium information pieces) corresponding to the number of medium types, each piece of medium information including a first identifier and a second identifier. Furthermore, the printer 120 stores a second medium file 203 (second file) in a second medium file storage region 204. Note that the second medium file storage region 204 is set in a nonvolatile memory such as the ROM 125. Further, the second medium file 203 can include a plurality of medium information pieces corresponding to the number of medium types, each piece of medium information including a first identifier and a second identifier.

Figure 3:
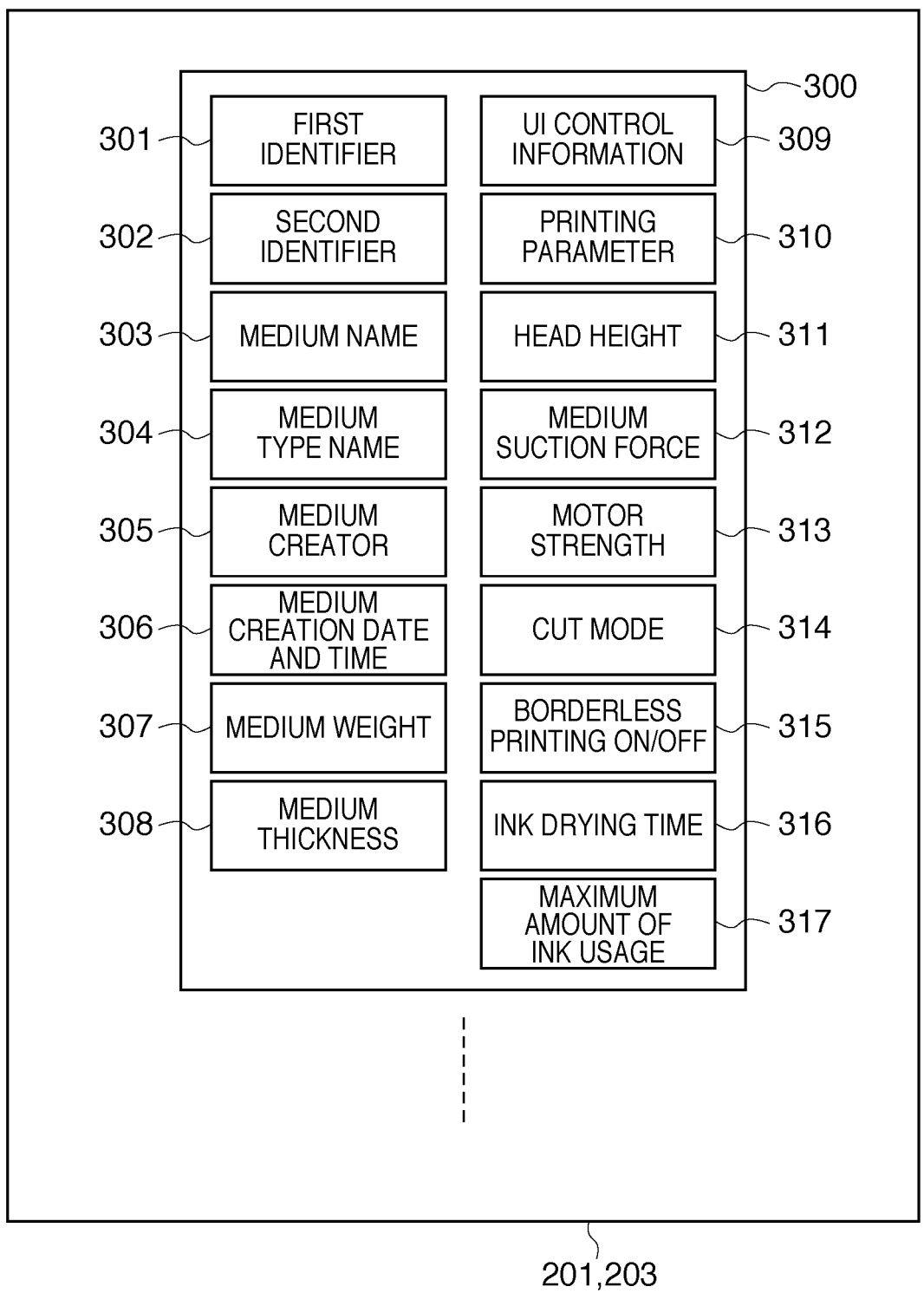
FIG. 3 is a diagram showing an example of a first medium file and a second medium file.

Here, medium information will be described. FIG. 3 is a diagram showing an example of the first medium file 201 and the second medium file 203. Although medium information 300 corresponding to only one medium type is shown in FIG. 3 to facilitate description, it is assumed that medium information pieces corresponding to a plurality of types of recording media that can be used in the printer are included in the first medium file 201 and the second medium file 203. The medium information 300 includes a first identifier 301 and a second identifier 302. The first identifier 301 and the second identifier 302 are assigned to each printing medium as a pair. In other words, it can be said that the first identifier 301 and the second identifier 302 correspond to each other in the first medium file 201 or the second medium file 203. Furthermore, the medium information 300 includes a medium name 303, a medium type name 304, a medium creator 305, a medium creation date and time 306, medium weight 307, a medium thickness 308, user interface control information 309, and a printing parameter 310, as shown in FIG. 3. Furthermore, as shown in FIG. 3, the medium information 300 includes a head height 311 of the printer 120, a medium suction force 312, motor strength 313 when feeding a medium, a cut mode 314, borderless print on/off 315, an ink drying time 316, and a maximum amount of ink usage 317. Note that the medium files may include an image processing parameter for executing various image processing on data to be printed, such as color processing, smoothing, and edge enhancement.

Information included in the medium files shown in FIG. 3 described above is used in the case where a method for creating data to be printed in the printing apparatus is determined, or the case where various operations (such as conveying a print medium, discharging ink, and moving the head) of the printing apparatus are determined. Accordingly, by reference to the information included in the medium files, image processing according to a medium type corresponding to the medium information can be performed, and various operations of the printing apparatus according to that medium type can be performed.

For example, an image processing parameter corresponding to a medium type indicated by the medium information is stored in the medium file. Then, in the computer 100 or the printer 120, image data to be printed suitable for the medium type can be created by performing image processing such as color correction using that image processing parameter. Further, the conveying speed of the print medium can be determined by reference to the medium weight 307, the medium thickness 308, and the motor strength 313. Furthermore, the timing at which next printing starts after printing of one print medium ends can be determined by reference to the ink drying time 316. Further, the distance between the printhead and the print medium is determined by reference to the head height 311. Furthermore, printing can be performed using a suitable amount of ink for the medium type by reference to the medium suction force 312 and the maximum amount of ink usage 317.

The first medium file 201 and the second medium file 203 include information such as the medium information 300 for each medium type. The computer 100 assigns the first identifier 301 and the second identifier 302 with respect to each of the medium information pieces 300, compiles medium information pieces corresponding to a plurality of types of recording media as one file, and registers that file in the computer 100 and the printer 120 (an example of first registration and second registration in the present embodiment). Firmware 205 of the printer 120 and the printer driver of the computer 100 can manage media using the first medium file 201 and the second medium file 203 registered in this manner.

Figure 4A:
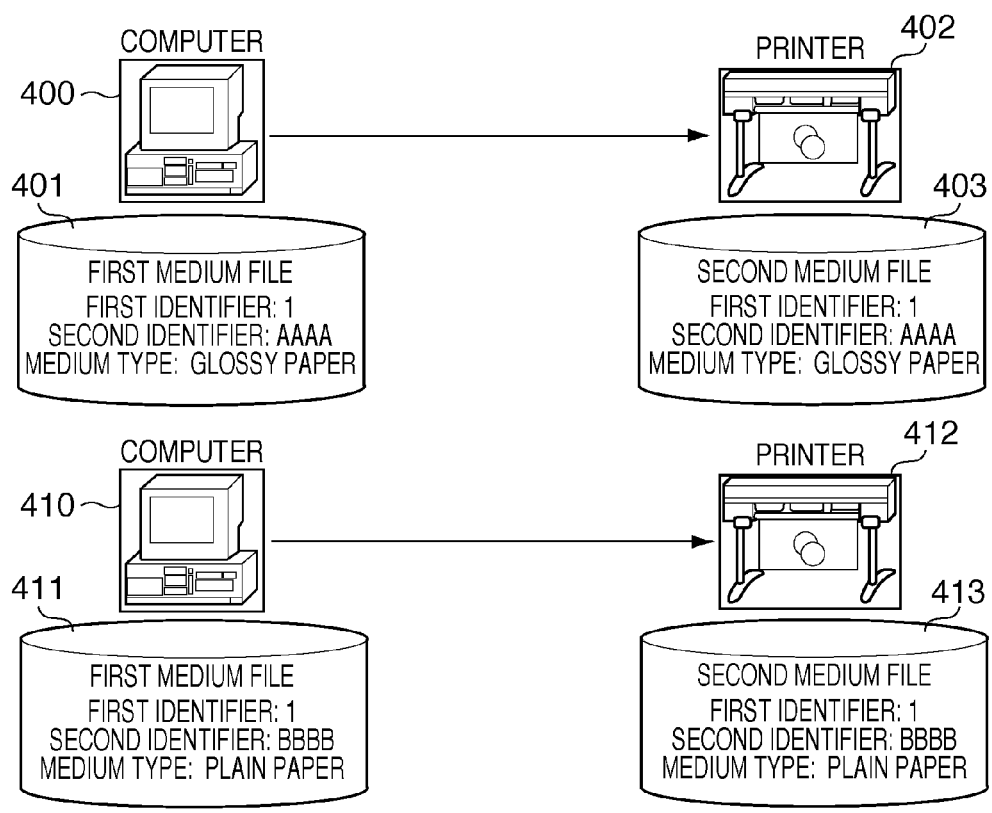
FIGS. 4A and 4B are diagrams showing an initial state in which a plurality of computers and printers are connected.

The first identifier 301 and the second identifier 302 that are included for each medium type will now be described with reference to FIGS. 4A and 4B. The first identifier is an identifier for the computer 100 to identify medium types registered in the printer 120 so that the medium types do not overlap. For example, in a computer 400 and a printer 402 shown in FIG. 4A, if the first identifier is "1", that first identifier is used to designate the medium type "glossy paper". Similarly, in a computer 410 and a printer 412, if the first identifier is "1", that first identifier is used to designate the medium type "plain paper". As shown in FIG. 4A, the relationship between the first identifier and a medium type is determined only in the computer and the printer that form a pair. Accordingly, different medium types may be designated in the computers 400 and 410 even if the first identifiers are the same. For example, in the example shown in FIG. 4A, even in the case of the same first identifier "1", it corresponds to "glossy paper" in the pair of the computer 400 and the printer 402, whereas it corresponds to "plain paper" in the computer 410 and the printer 412. Note that ordinarily, simplified numbers such as "1" and "2", for instance, are used for the first identifier as shown in FIG. 4A.

On the other hand, the second identifier is an identifier uniquely assigned to each medium type. As shown in FIG. 4A, a second identifier "AAAA" is given if the medium type is glossy paper, whereas "BBBB" is given if it is plain paper. Here, there are cases where the user himself or herself provides a medium (so-called user medium) supported by a printer in a completely different printing system and uses that medium in the printer 402 or 412, rather than only media supported by the printer 402 or 412. However, even if such a user medium is the same as the medium that is already supported by the printer 402 or 412 in terms of the type "glossy paper", for example, that user medium may have different characteristics, such as the ink impregnation amount. Accordingly, if the medium that is already supported by the printer 402 or 412 and the user medium are treated as the same type of medium, an appropriate printing result may not be achieved due to the difference in the characteristics of those recording media. Accordingly, it is necessary to identify the above medium and the user medium as different recording media although the type "glossy paper" is the same. Accordingly, it is necessary to assign the above-described second identifier that is uniquely assigned to each medium type to a user medium. Further, the first identifier can be identified only in the pair of a specific computer and a specific printer, whereas the second identifier can be used in common as an identifier for specifying a medium type in any computer or printer in a printing system. However, this second identifier needs to include not only the name of a medium type but also the above characteristics such as the ink impregnation amount, and thus ordinarily, the second identifier is not a simplified identifier like the first identifier. Therefore, in normal print processing, if an information processing apparatus and a printing apparatus performs communication with use of a second identifier, the amount of data to be transmitted and received will be considerable. Accordingly, when performing printing, the information processing apparatus and the printing apparatus ensure consistency of the type of medium used for printing by performing communication with use of a first identifier.

If a new user medium is used for printing, a second identifier of the user medium is added to medium information held in both the information processing apparatus and the printing apparatus, and a first identifier for that user medium is assigned in the information processing apparatus and the printing apparatus.

In the present embodiment, a medium type is specified using both the first identifier and the second identifier as described above, and even if the first identifiers are the same when medium information pieces are compared, it is not determined that the same medium type is designated based on only that fact. That is, even if the first identifiers are the same, it is determined that different medium types are designated if the second identifiers are different. Consequently, consistency of designation of medium types in the medium information pieces can be reliably achieved.

Referring again to FIG. 2, the firmware 205 of the printer 120 controls the printer, and manages media using the second medium file 203. Further, the printer driver (not shown) of the computer 100 controls the printer, and manages media using the first medium file 201. The first medium file 201 and the second medium file 203 are registered by the computer 100. A medium update program 206 of the computer 100 updates either the first medium file 201 or the second medium file 203 or both of the medium files by performing medium information update processing described later. In the present embodiment, consistency of designation of medium types in the medium information pieces can be achieved by performing the update processing. Note that the medium update program 206 is stored in the ROM 103 of the computer 100, and medium information update processing can be performed by the CPU 101 reading out the medium update program from the ROM 103 into the RAM 102 and executing the read program. Further, the firmware 205 is stored in the ROM 125, and control of the printer and management of media can be performed by the CPU 124 reading out the firmware into the RAM 126 and executing the read firmware.

FIG. 4A is a diagram showing an initial state in which a plurality of computers and a plurality of printers are connected. The computer 400 (first information processing apparatus) and the printer 402 (first printing apparatus) respectively hold a first medium file 401 and a second medium file 403 each of which includes a first identifier and a second identifier. In FIG. 4A, medium information corresponding to only one medium type is shown to facilitate description. As shown in FIG. 4A, the first identifier in the first medium file 401 is "1", and the second identifier therein is "AAAA" indicating glossy paper. Further, the first identifier in the second medium file 403 is "1", and the second identifier therein is "AAAA" indicating glossy paper. Accordingly, in the computer 400 and the printer 402, both the first identifiers and the second identifiers match, and thus the medium information pieces have consistency.

Further, the computer 410 (second information processing apparatus) and the printer 412 (second printing apparatus) respectively hold a first medium file 411 and a second medium file 413 each of which includes a first identifier and a second identifier. As shown in FIG. 4A, the first identifier in the first medium file 411 is "1", and the second identifier therein is "BBBB" indicating plain paper. Further, the first identifier in the second medium file 413 is "1", and the second identifier therein is "BBBB" indicating plain paper. Accordingly, in the computer 410 and the printer 412 as well, both the first identifiers and the second identifiers match, and thus the medium information pieces have consistency.

Figure 4B:
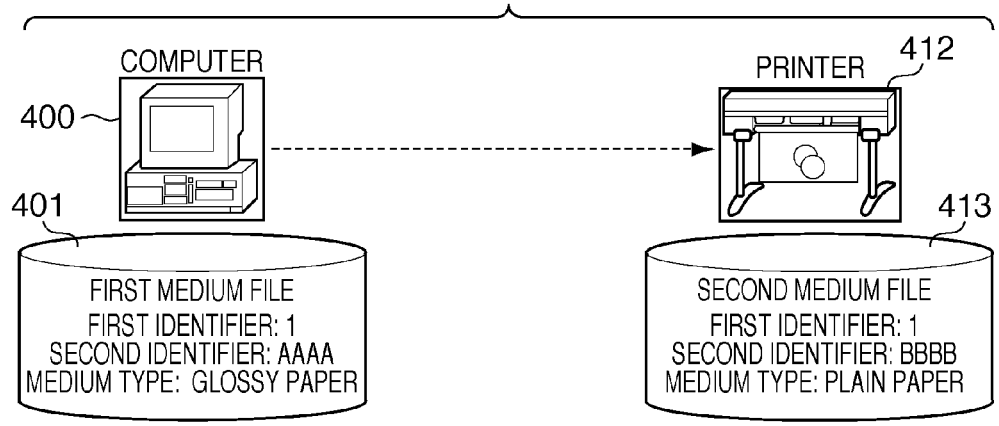

Here, a printer connected to the computer 400 is switched to the printer 412 as shown in FIG. 4B. In that case, the first identifiers of the first medium file 401 and the second medium file 413 are "1", and thus match. Conventionally, since the first identifiers match, printing is performed assuming that the same medium type is designated in the first medium file 401 and the second medium file 413. However, as shown in FIG. 4B, actually, the medium type "glossy paper" is designated in the first medium file 401, and the medium type "plain paper" is designated in the second medium file 413. Accordingly, problems may arise with the result of print processing. In the present embodiment, consistency of the first medium file 401 and the second medium file 413 can be achieved from the state in FIG. 4B.

FIG. 5 is a flowchart showing an overview of a processing procedure for updating medium information in the present embodiment. Note that in the present embodiment, a program corresponding to the flowchart shown in FIG. 5 is stored in the ROM 103, and the processing shown in FIG. 5 can be performed by the CPU 101 reading out and executing this program. The flowchart shown in FIG. 5 is executed by the CPU 101 in the case where a printer connected to the computer 100 is switched to the printer 120, as shown in FIG. 4B. First, in S501, the computer 100 starts the medium update program 206. With regard to the start of the medium update program, the medium update program 206 may be automatically started if the computer detects that a connection destination printer has been changed, for example. In S502, the medium update program 206 obtains the first medium file 201 in the computer 100 and the second medium file 203 stored in the printer 120. In S503, with regard to the first medium file 201 and the second medium file 203 that have been obtained, first identifiers and second identifiers corresponding to medium types are compared. According to the comparison result, either the first medium file 201 or the second medium file 203 or both of the medium files are updated.

FIG. 6 is a flowchart showing details of the processing in S503 shown in FIG. 5. In S601, the medium update program 206 of the computer 100 first determines, with respect to all the medium information pieces included in the first medium file 201 and the second medium file 203, whether or not there are medium information pieces whose second identifiers match. For example, medium information pieces included in the first medium file 201 of the computer 100 (hereinafter, referred to as target medium information (first printing medium information)) and medium information pieces included in the second medium file 203 of the printer 120 (second printing medium information) are sequentially compared. In S601, if it is determined that there are medium information pieces whose second identifiers match in the first medium file 201 and the second medium file 203, the processing proceeds to S602, and if it is determined that there are not such medium information pieces, the processing proceeds to S605.

In S602, it is determined whether or not there are medium information pieces whose second identifiers match but whose first identifiers do not match. Here, if the determination result is "No", it is determined that common first identifiers are given to media whose type is the same (medium types whose second identifiers match) in the first medium file 201 and the second medium file 203, and the processing proceeds to S605.

On the other hand, if the determination result is "Yes" in S602, it is determined that different first identifiers are given to media whose type is the same (medium types whose second identifiers match) in the first medium file and the second medium file, and the processing proceeds to S603. Then, in S603, the first identifier of the medium information whose second identifier matches in the second medium file 203 is assigned to the first identifier of the target medium information in the first medium file 201. In S604, the first medium file 201 stored in the first medium file storage region 202 is overwritten with the first medium file 201 on which assignment was performed in S603, and updated. Accordingly, common first identifiers can be given to the media whose type is the same (medium types whose second identifiers match). When this update processing ends, the processing proceeds to S605.

In S605, it is determined whether or not there is any medium information whose first identifier matches but whose second identifier does not match in the second medium file 203. Here, if the determination result is "Yes", the processing proceeds to S606, whereas if the determination result is "No", the processing proceeds to S608.

In S606, a new identifier that is not used in the first medium file 201 and the second medium file 203 is assigned to the first identifier of the target medium information in the first medium file. In S607, the first identifier stored in the first medium file storage region 202 is overwritten with the first identifier that was assigned to the target medium information in S606, and updated. In addition, in S607, the target medium information to which the above-unused new first identifier has been given is added to the second medium file 203. Thus, the medium information registered in the computer 100 can be added to the printer 120 by adding the target medium information to the second medium file 203, thereby updating the second medium file 203. In S607, this processing ends when the second medium file 203 stored in the second medium file storage region 204 is updated.

In the case where there are media whose second identifiers match in the computer 100 and the printer 120, in S608, by performing the processing in S601 to S604 described above, the first identifier particular to the medium is given in the medium information pieces of the computer 100 and the printer 120, and thus the first identifiers match in the computer 1000 and the printer 120. Further, if there are media whose second identifiers do not match in the computer 100 and the printer 120 as a result of the determination in S605, first identifiers respectively corresponding only to those second identifiers have been given. Therefore, it is not necessary to update the first identifier here. The second medium file 203 stored in the second medium file storage region 204 is updated by adding the target medium information in the first medium file to the second medium file 203, and this processing ends. Further, in the present embodiment, in S608, medium information in the second medium file 203 compared to the target medium information may be added to the first medium file 201.

The case where the processing shown in FIG. 6 is executed in the state of FIG. 4B will now be described as an example. Here, it is assumed that the first medium file 401 includes only medium information (the first identifier is "1" and the second identifier is "AAAA") and the second medium file 413 includes only medium information (the first identifier is "1" and the second identifier is "BBBB").

First, target medium information is the medium information included in the first medium file 401 (the first identifier is "1" and the second identifier is "AAAA"). In S601, it is determined that the second medium file 413 has no medium information having the second identifier that matches the second identifier "AAAA" of the target medium information. Accordingly, the processing proceeds to S605. In S605, it is determined that the second medium file 413 has medium information having the first identifier that matches the first identifier "1" of the target medium information but that the second identifiers do not match. Accordingly, the processing proceeds to S606. In S606, a new identifier that is not used in the first medium file 401 and the second medium file 413 is assigned to the first identifier of the target medium information. In this example, for example, "2" is assigned to the first identifier of the target medium information. Further, in S607, the target medium information to which the unused new first identifier has been given is added to the second medium file 413.

Figure 7A:
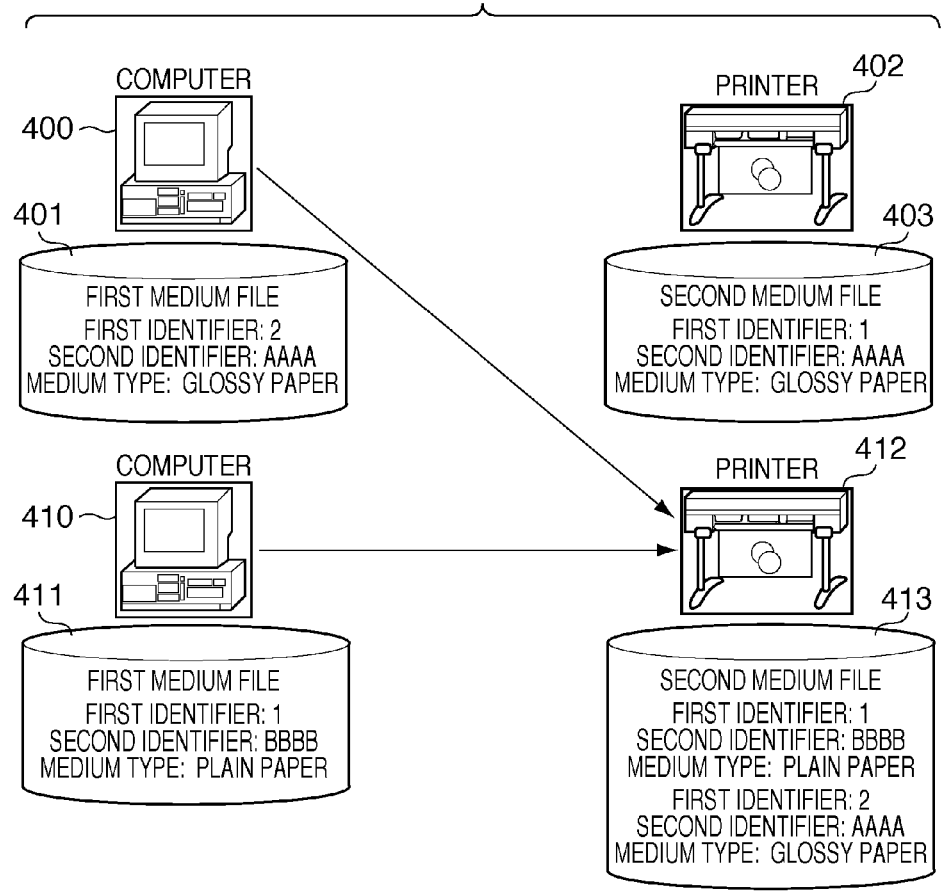
FIGS. 7A and 7B are diagrams showing the result of an example in which the processing in FIG. 6 has been executed.

FIG. 7A is a diagram showing the result of having executed the processing in FIG. 6 in this example. That is, as shown in FIG. 7A, the first identifier is "2" in the first medium file 401. The second identifier is the same as that in the first medium file 401 shown in FIG. 4B. Further, as shown in FIG. 7A, the medium information in the first medium file 401 (the first identifier is "2" and the second identifier is "AAAA") has been newly added to the second medium file 413.

Thus, as shown in FIG. 4B, from the state where the same first identifier is given to different medium types, and thus medium information pieces do not have consistency, consistency of medium information pieces can be achieved as shown in FIG. 7A by performing the processing in FIGS. 5 and 6.

Figure 7B:
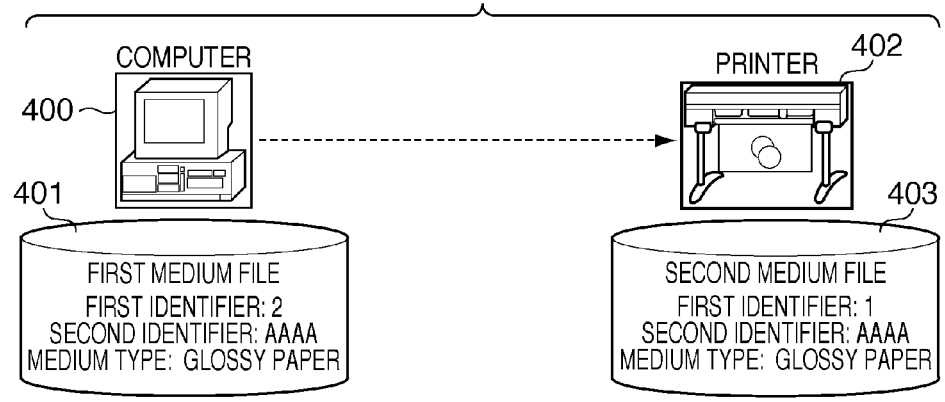

Next, from the state in FIG. 7A, the printer connected to the computer 400 is again switched to the printer 402 as shown in FIG. 7B. Here as well, it is assumed that the first medium file 401 includes only medium information (the first identifier is "2" and the second identifier is "AAAA"), and the second medium file 403 includes only medium information (the first identifier is "1" and the second identifier is "AAAA"). In that case, in the first medium file 401 and the second medium file 403, different first identifiers have been given to the same medium type, and thus the medium information pieces do not have consistency. In the example shown in FIG. 7B, even though the medium type is glossy paper and actually the same but the first identifiers are different, and thus the computer 400 will determine that different medium types are designated.

In this example, if the printer connected to the computer 400 is switched to the printer 402 as shown in FIG. 7B, the computer 400 starts the medium update program 206 in S501 shown in FIG. 5. In S502, the medium update program 206 obtains the first medium file 401 and the second medium file 403. In S503, the first identifiers and the second identifiers in the first medium file 401 and the second medium file 403 that have been obtained are compared, and either the first medium files 401 or the second medium files 403 or both of the medium files are updated.

The processing in S503 in this example is described with reference to FIG. 6. Target medium information is the medium information (the first identifier is "2" and the second identifier is "AAAA") in the first medium file 401. In S601, it is determined that medium information whose second identifier matches the second identifier of the target medium information is in the second medium file 403, and thus the processing proceeds to S602. Next, in S602, it is determined that the second identifier matches that in the second medium file but that the first identifiers do not match in the medium information pieces (here, the second identifiers are "AAAA"), and thus the processing proceeds to S603. In S603, the first identifier "2" in the first medium file 401 is changed to the first identifier "1" in the second medium file 403. Next, in S604, the first medium file stored in the first medium file storage region 202 is overwritten with the first medium file 401, and updated.

Figure 8:
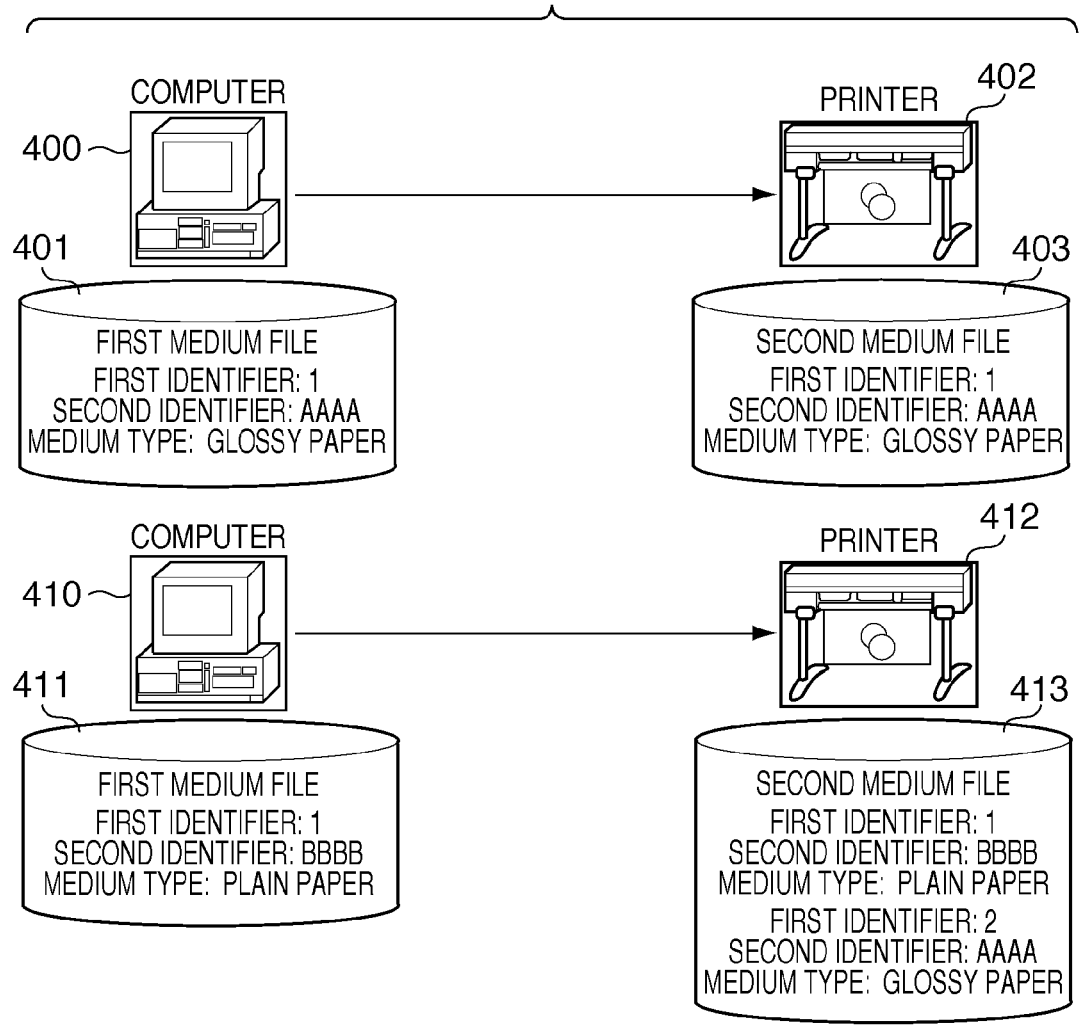
FIG. 8 is a diagram showing the state of an example in which the processing in FIGS. 5 and 6 has been executed.

FIG. 8 is a diagram showing the state in the case where the processing in FIG. 5 and FIG. 6 has been executed in this example. As shown in FIG. 8, the first medium file 401 and the second medium file 403 have consistency since the first identifiers and the second identifiers match.

Note that in the example shown in FIG. 8, the second identifiers also match in the medium information pieces whose first identifiers match after processing for updating the first medium file is performed in S604, and thus the processing proceeds to S608 after the determination in S605. Note that since the first medium file does not include medium information to be added to the second medium file, the processing ends without performing processing for updating the second medium file in S608.

As described above, in the present embodiment, in the case of the configuration in which a plurality of computers and a plurality of printers are connected, identifiers held in medium information pieces are dynamically reassigned, thereby preventing inconsistency of designation of medium types in the medium information pieces of the computers and the printers. Consequently, the user can be provided with an appropriate printing result.

Note that in the above embodiment, processing is performed in which the first identifiers and the second identifiers are obtained, and the first identifier that does not have consistency is updated such that consistency of information pieces for specifying the medium type is achieved in the computer 100 and the printer 120. However, the present invention is not limited to the case where the first identifier that does not have consistency is updated. That is, regardless of whether the first identifier has consistency at the point in time of executing processing, all the first identifiers set in the computer 100 and the printer 120 may be newly set. In this case, it is sufficient if the second identifiers set in the computer 100 and the printer 120 are obtained and the first identifiers are determined, and thus when processing for determining the first identifiers is performed, it is not necessary to obtain the first identifiers set in the computer 100 and the printer 120 at that point in time.

Furthermore, in the above embodiment, an example has been described in which the CPU of the computer 100 updates medium information by performing the processing shown in the flowcharts in FIGS. 5 and 6. However, the present invention is not limited to this, and the above update processing may be executed in the printer 120. In that case, the program corresponding to the flowcharts in FIGS. 5 and 6 is stored in the ROM 125, and processing in the present embodiment can be realized by the CPU 124 reading out this program.

Further, the present invention is not limited to the case where processing in the present embodiment is performed in either one of the computer 100 and the printer 120, and may be applied to the case where the CPUs respectively included cooperatively perform processing. Moreover, even in the case where processing is performed in either the computer 100 or the printer 120, the present invention is not limited to the case where one processor performs processing, and a plurality of processors may cooperatively perform processing.

Furthermore, the present invention is applicable to the case where processing in the present embodiment such as processing for determining first identifiers set in the computer 100 and the printer 120 and processing for updating medium information of each apparatus may be executed in an apparatus other than the computer 100 and the printer 120.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-293206, filed Dec. 24, 2009, which is hereby incorporated by reference herein in its entirety.

What is claimed is:

1. A device comprising:
an obtaining unit configured to, in a case where a first identifier that is communicated between a printing apparatus and an information processing apparatus in order to specify a type of a printing medium that is used in the printing apparatus, and a second identifier unique to each of a plurality of types of printing medium are set in both the printing apparatus and the information processing apparatus, obtain the first identifier and the second identifier set in each of the information processing apparatus and the printing apparatus;
a determination unit configured to determine whether different first identifiers are set with respect to a type of printing medium which is common in the information processing apparatus and the printing apparatus, based on the first identifier and the second identifier obtained by the obtaining unit; and
a changing unit configured to, in a case where it is determined by the determining unit that the different first identifiers are set, change the first identifier set in at least one of the information processing apparatus and the printing apparatus, such that a common first identifier is set with respect to the type of printing medium which is common in the information processing apparatus and the printing apparatus.

2. The device according to claim 1, wherein in a case where a combination of the information processing apparatus and the printing apparatus is changed, the determination unit executes the determination to the new combination.

3. The device according to claim 1, wherein the device is the information processing apparatus.

4. The device according to claim 3 wherein the information processing apparatus changes the first identifier set in the information processing apparatus by the changing unit, and does not change the first identifier set in the printing apparatus.

5. The device according to claim 1, wherein both the information processing apparatus and the printing apparatus have information for performing processing for printing an image according to a type of printing medium corresponding to the second identifier, and execute the processing for printing the image in accordance with the information.

6. The device according to claim 1, wherein if there is a second identifier that is only set either in the information processing apparatus or in the printing apparatus, the apparatus in which the second identifier is not set is caused to store information for performing processing for printing an image according to the type of printing medium corresponding to the second identifier.

7. The device according to claim 1, wherein a file including the first identifier and the second identifier is stored in each of the information processing apparatus and the printing apparatus, and the obtaining unit obtains the file stored in each of the information processing apparatus and the printing apparatus from each of the information processing apparatus and the printing apparatus.

8. The device according to claim 7, wherein the determination unit executes the determination, by comparing the files obtained by the obtaining unit from the information processing apparatus and the printing apparatus.

9. The device according to claim 1, wherein the device is the printing apparatus.

10. A control method comprising:
in a case where a first identifier that is communicated between a printing apparatus and an information processing apparatus in order to specify a type of printing medium that is used in the printing apparatus, and a second identifier unique to each of a plurality of types of printing medium are set in both the printing apparatus and the information processing apparatus, obtaining the first identifier and the second identifier set in each of the information processing apparatus and the printing apparatus; and
determining whether different first identifiers are set with respect to a printing medium of a common type in the information processing apparatus and the printing apparatus, based on the obtained first identifier and second identifier; and in a case where it is determined that the different first identifiers are set with respect to a type of printing medium which is common in the information processing apparatus and the printing apparatus, changing the first identifier set in at least one of the information processing apparatus and the printing apparatus, such that a common first identifier is set with respect to the type of printing medium which is common in the information processing apparatus and the printing apparatus.

11. The method according to claim 10, wherein in a case where a combination of the information processing apparatus and the printing apparatus is changed, the determination is executed to the new combination.

12. The method according to claim 10, wherein each step defined in claim 9 is executed in the information processing apparatus.

13. The method according to claim 12, wherein the first identifier set in the information processing apparatus is changed, and the first identifier set in the printing apparatus is not changed.

14. The method according to claim 10, wherein both the information processing apparatus and the printing apparatus have information for performing processing for printing an image according to a type of printing medium corresponding to the second identifier, and further comprising:
executing the processing for printing the image in accordance with the information.

15. The method according to claim 10, wherein if there is a second identifier that is only set either in the information processing apparatus or in the printing apparatus, and further comprising:
causing the apparatus in which the second identifier is not set to store information for performing processing for printing an image according to the type of printing medium corresponding to the second identifier.

16. The method according to claim 10, wherein a file including the first identifier and the second identifier is stored in each of the information processing apparatus and the printing apparatus, and further comprising:
obtaining the file stored in each of the information processing apparatus and the printing apparatus from each of the information processing apparatus and the printing apparatus.

17. The method according to claim 16, wherein the determination is executed by comparing the files obtained from the information processing apparatus and the printing apparatus.

18. The method according to claim 10, wherein each step defined in claim 9 is executed in the information processing apparatus.

19. A non-transitory storage medium storing therein a program for causing a computer to execute the control method according to claim 10.

* * * * *